United States Patent
Otsubo (10) Patent No.: US 12,411,356 B2
(45) Date of Patent: Sep. 9, 2025

(54) AERIAL IMAGE FORMING ELEMENT COMPRISING A TRANSPARENT BASE MEMBER HAVING FIRST AND SECOND REFLECTING SURFACES AND AERIAL IMAGE FORMING DEVICE

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 375 days.

(21) Appl. No.: 18/030,812

(22) PCT Filed: Sep. 16, 2021

(86) PCT No.: PCT/JP2021/034136
§ 371 (c)(1),
(2) Date: Apr. 7, 2023

(87) PCT Pub. No.: WO2022/080082
PCT Pub. Date: Apr. 21, 2022

(65) Prior Publication Data
US 2023/0408842 A1 Dec. 21, 2023

(30) Foreign Application Priority Data
Oct. 15, 2020 (JP) ................................. 2020-174154

(51) Int. Cl.
*G02B 30/56* (2020.01)
(52) U.S. Cl.
CPC .................... *G02B 30/56* (2020.01)
(58) Field of Classification Search
CPC .................. G02B 30/35; G03B 35/18
See application file for complete search history.

(56) References Cited

U.S. PATENT DOCUMENTS

| | | | |
|---|---|---|---|
| 2010/0195055 A1* | 8/2010 | Maekawa | G02B 5/136 353/10 |
| 2018/0039050 A1* | 2/2018 | Rose | H04N 13/243 |
| 2020/0124870 A1 | 4/2020 | Otsubo | |

FOREIGN PATENT DOCUMENTS

| | | |
|---|---|---|
| EP | 2180365 A1 | 4/2010 |
| EP | 3647858 A1 | 5/2020 |

(Continued)

OTHER PUBLICATIONS

Extended European Search Report dated Oct. 2, 2024 counterpart application No. 21879823.9 (9 pages).

(Continued)

*Primary Examiner* — Paul C Lee
(74) *Attorney, Agent, or Firm* — Tsuyoshi Nakamura (57) ABSTRACT

An aerial image forming element 10a used for an aerial image forming device 30 includes a plurality of first and second light reflecting surfaces 12 and 14 respectively formed vertically on the obverse and reverse surfaces of a flat plate-like transparent base member 11a. The plurality of first light reflecting surfaces 12 are placed radially on the obverse surface side of the transparent base member 11a centered on a reference point X existing outside the transparent base member 11a in planar view. The plurality of second light reflecting surfaces 14 are placed concentrically on the reverse surface side of the transparent base member 11a centered on a reference point Y overlapping the reference point X in planar view. The aerial image forming element forms light externally entering and reflected once by each of the first and second light reflecting surfaces 12 and 14 into an image in the air.

4 Claims, 9 Drawing Sheets

(56) References Cited

FOREIGN PATENT DOCUMENTS

| JP | 2017-151154 A | 8/2017 | | |
|----|---------------|--------|---|---|
| JP | 6591127 B2 | 10/2019 | | |
| JP | 2020-027125 A | 2/2020 | | |
| WO | 2009/017134 A1 | 2/2009 | | |
| WO | 2009/131128 A1 | 10/2009 | | |
| WO | WO-2016132984 A1 * | 8/2016 | ............... | G02B 5/08 |
| WO | WO-2019003730 A1 * | 1/2019 | ............. | G02B 30/35 |
| WO | WO-2019159758 A1 * | 8/2019 | ............. | G02B 5/003 |

OTHER PUBLICATIONS

International Search Report dated Nov. 22, 2021, issued in counterpart International Application No. PCT/JP2021/034136, with English translation. (6 pages).
Decision to Grant a Patent dated Feb. 8, 2022, issued in counterpat JP Application No. 2021-576400, with English translation. (5 pages).

* cited by examiner

AERIAL IMAGE FORMING ELEMENT COMPRISING A TRANSPARENT BASE MEMBER HAVING FIRST AND SECOND REFLECTING SURFACES AND AERIAL IMAGE FORMING DEVICE

TECHNICAL FIELD

The present invention relates to an aerial image forming element and an aerial image forming device which form an aerial image (stereoscopic image) of an object in the air by using light (scattered light) emitted from an object surface (target object).

BACKGROUND ART

As a device that forms an aerial image (stereoscopic image) of an object by using light (scattered light) emitted from an object surface, for example, there is known a stereoscopic image forming device (optical image forming device) disclosed in patent literature 1. This image forming device includes first and second optical control panels formed by arranging flat light reflecting portions formed from a plurality of band-shaped reflecting metal surfaces (mirror surfaces) perpendicular to one surface of a transparent flat plate at a predetermined pitch inside the transparent flat plate. One-surface sides of the first and second optical control panels are made to face and tightly adhere to each other such that the flat light reflecting portions of the first and second optical control panels are orthogonal to each other in planar view. In manufacturing the first and second optical control panels, a laminated body is prepared by stacking a plurality of plate-like transparent synthetic resin plates or glass plates (hereinafter also referred to as "transparent plates") having reflecting metal surfaces formed on one-surface sides and a predetermined thickness such that the reflecting metal surfaces are placed on one side and cutting the laminated body so as to form cut surfaces perpendicular to the respective reflecting metal surfaces.

However, these manufacturing processes take much time and labor to prepare a laminated body. In addition, since the first and second optical control panels cut out from the laminated body are significantly thin, and the respective cut surfaces (both surfaces) need to be processed, such as polishing, the working processes are complicated, and the manufacturing efficiency is low. In forming a reflecting metal surface on a transparent plate by metal deposition, a large deposition furnace is required. Moreover, it is also necessary to repeat one hundred or more times the work of degassing the deposition furnace accommodating one or a small number of transparent plates to high vacuum, performing a deposition process, and taking out the metal-deposited transparent plates upon releasing the deposition furnace to the atmospheric pressure, thus requiring much time and labor. The placement interval (pitch) between the reflecting metal surfaces is limited by the thickness of each transparent plate. This imposes limitations on the brightness and sharpness of a stereoscopic image. In addition, since the plurality of reflecting metal surfaces of the first and second optical control panels are linear (parallel) and placed orthogonal in planar view, limitations are also imposed on the viewing angle (image forming range). Accordingly, this device is not suitable for use by a large group.

In contrast to this, patent literature 2 discloses a stereoscopic image forming device (aerial image forming device) including a plurality of first vertical light reflecting portions provided on one side of a transparent plate member radially centered on a reference point X and a plurality of second vertical light reflecting portions provided on the other side of the transparent plate member in a concentric manner centered on a reference point Y overlapping the reference point X in planar view so as to intersect the first vertical light reflecting portions. In this stereoscopic image forming device, the first vertical light reflecting portions (radial light reflecting portions) provided radially centered on the reference point X are formed linearly, whereas the second vertical light reflecting portions (concentric light reflecting portions) provided in a concentric manner are bent along concentric circles centered on the reference point Y. The first vertical light reflecting portions and the second vertical light reflecting portions are orthogonal to each other at a point where the first and second vertical light reflecting portions intersect each other in planar view. Accordingly, this stereoscopic image forming device is also possible to form a stereoscopic image in a similar manner as the stereoscopic image forming device disclosed in patent literature 1. The first and second vertical light reflecting portions in patent literature 2 respectively use the vertical surfaces of a plurality of radial grooves formed on one-surface side of the transparent flat plate member and the vertical surfaces of a plurality of concentric grooves formed on the other-surface side of the transparent flat plate member. The respective grooves can be easily manufactured by press molding, injection molding, etc., and the placement interval (pitch) can be reduced, thereby forming a brighter and sharper stereoscopic image than the prior art. In addition, the first vertical light reflecting portions are provided radially, and the second vertical light reflecting portions are concentrically provided, thereby allowing observation of a stereoscopic image from various circumferential directions. In addition, this device has a wider viewing angle than the prior art and fewer ghost images appear. Accordingly, it provides excellent visibility by allowing a large group to observe the image.

CITATION LIST

Patent Literature

Patent Literature 1: WO 2009/131128
Patent Literature 2: Japanese Patent No. 6591127

SUMMARY OF INVENTION

Technical Problem

However, the stereoscopic image forming device disclosed in patent literature 2 locally has a region where the direction of the gaze of an observer in planar view becomes almost parallel to the reflecting metal surfaces (mirror surfaces) of the first vertical light reflecting portions since the first vertical light reflecting portions are placed radially. Accordingly, the following problem occurs such that, of light entering the stereoscopic image forming device, light entering almost parallel to the reflecting metal surfaces of the first vertical light reflecting portions in planar view, reflected by only the second vertical light reflecting portions, and emerging into the air without being reflected by the first vertical light reflecting portions is observed as a ghost image depending on the direction of the gaze of the observer.

The present invention has been made in consideration of the above circumstances and has an object to provide an aerial image forming element that is easily manufactured and is excellent in visibility and an aerial image forming device that includes the aerial image forming element as well as achieving an increase in viewing angle, preventing the occurrence of ghost images, and obtaining a sharp aerial image.

Solution to Problem

An aerial image forming element according to the first invention in line with the above object includes a plurality of first light reflecting surfaces and a plurality of second light reflecting surfaces respectively formed vertically on an obverse surface and a reverse surface of a flat plate-like transparent base member and forms light externally entering and reflected once by each of the first and second light reflecting surfaces into an image in air. The plurality of first light reflecting surfaces are placed radially on an obverse surface side of the transparent base member centered on a reference point X existing outside the transparent base member in planar view, and the plurality of second light reflecting surfaces are placed concentrically on a reverse surface side of the transparent base member centered on a reference point Y overlapping the reference point X in planar view.

In this case, externally incident light is light (scattered light) emitted from the surface of a target object, and an aerial image (stereoscopic image) of the object is formed in the air by image forming. Aerial images include a planar image (two-dimensional image) and a stereoscopic image (three-dimensional image). When a target object is an image displayed on an image display means such as a display, a planar image (two-dimensional image) as a real image is formed as an aerial image. When a target object is one of various types of stereoscopic objects, a stereoscopic image (three-dimensional image) as a real image of the object is formed as an aerial image (the same applies to the second invention).

In the aerial image forming element according to the first invention, the transparent base member is formed in a rectangular shape in planar view, and the reference point X and the reference point Y can be located on an extension of any one of the sides of an outer circumference of the transparent base member in planar view.

In the aerial image forming element according to the first invention, the transparent base member is formed in a square shape in planar view, and the reference point X and the reference point Y may be located on an extension of one of diagonal lines of the transparent base member in planar view.

In the aerial image forming element according to the first invention, the transparent base member is formed in a square shape in planar view, and the reference point X and the reference point Y are preferably located on an extension of a reference line obtained by rotating one of two diagonal lines of the transparent base member in planar view clockwise or counterclockwise by a predetermined angle α within a horizontal plane centered on an intersection Z of the two diagonal lines.

In the aerial image forming element according to the first invention, the rotating direction of the predetermined angle α is clockwise, and a side, of sides of an outer circumference of the transparent base member in planar view, which overlaps a start position when each of the second light reflecting surfaces is traced clockwise is preferably placed to face an observer. Alternatively, the rotating direction of the predetermined angle α is counterclockwise, and a side, of sides of an outer circumference of the transparent base member in planar view, which overlaps an end position when each of the second light reflecting surfaces is traced clockwise is further preferably placed to face an observer.

In the aerial image forming element according to the first invention, the predetermined angle α is preferably 5° to 15° (more preferably 10°).

An aerial image forming device according to the second invention in line with the above object includes the aerial image forming element according to the first invention.

In the aerial image forming device according to the second invention, two aerial image forming elements according to the first invention are placed bilaterally symmetrically in planar view.

Advantageous Effects of Invention

The aerial image forming element according to the first invention and the aerial image forming device according to the second invention can maximally reduce regions where the direction of the gaze of the observer in planar view at the time of use coincides with the longitudinal direction of the first light reflecting surfaces placed radially, obtain a sharp aerial image with almost no ghost images, greatly widen the viewing angle (image forming range), and improve the visibility.

DESCRIPTION OF EMBODIMENTS

An aerial image forming element and an aerial image forming device according to an embodiment of the present invention will be described next with reference to the accompanying drawings.

Figure 1:
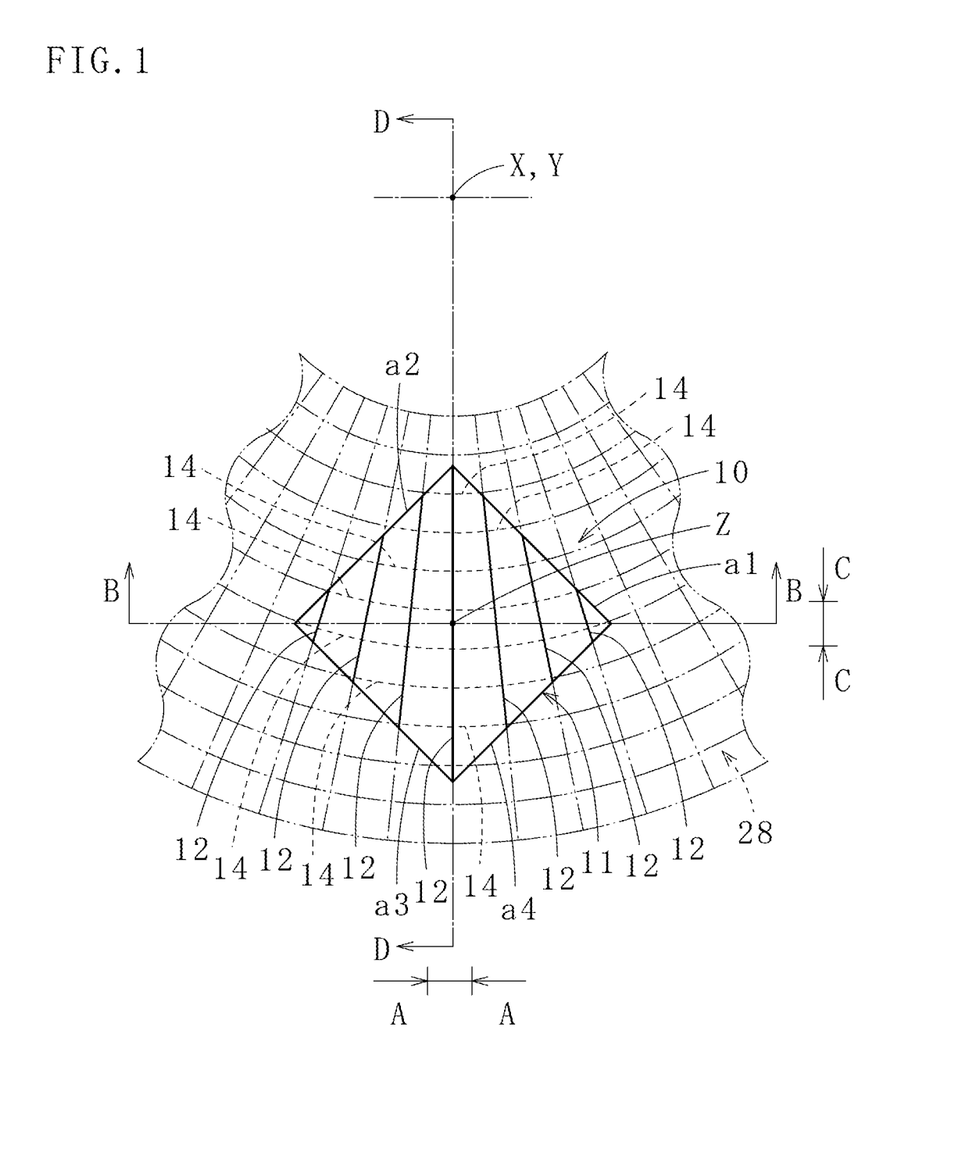
FIG. 1 is a plan view showing an aerial image forming element according to the first embodiment of the present invention.

An aerial image forming element 10 according to the first embodiment of the present invention shown in FIG. 1 includes first and second light reflecting surfaces 12 and 14 respectively formed vertically on the obverse and reverse surfaces of a plate-like transparent base member 11 and forms light externally entering and reflected once by each of the first and second light reflecting surfaces 12 and 14 into an image in the air. Accordingly, when light (scattered light) emitted from an object surface as a target externally enters the aerial image forming element 10 so as to form an image, an aerial image (stereoscopic image) of the object can be formed in the air.

The transparent base member 11 is formed in a rectangular shape (a square shape in this case) in planar view. The plurality of first light reflecting surfaces 12 are placed on the obverse surface side (the upper surface side in this case) of the transparent base member 11 radially centered on a reference point X existing outside the transparent base member 11 in planar view. The plurality of second light reflecting surfaces 14 are placed on the reverse surface side (the lower surface side in this case) of the transparent base member 11 concentrically centered on a reference point Y overlapping the reference point X in planar view.

In this case, the first light reflecting surfaces (hereinafter also referred to as radial light reflecting surfaces) 12 and the second light reflecting surfaces (hereinafter also referred to as concentric light reflecting surfaces) 14 are both placed at a pitch of 200 μm to 1000 μm, preferably 200 μm to 300 μm. FIG. 1 shows only part of these reflecting surfaces (at larger pitches). In addition, the radial light reflecting surfaces are preferably placed at equal angular intervals in the circumferential direction, and the concentric light reflecting surfaces are preferably placed at equal intervals in the radial direction. However, these intervals may differ depending on how they are placed or these reflecting surfaces may be placed partly at different intervals. For example, even if radial light reflecting surfaces are placed at equal angular intervals, the intervals between the adjacent radial light reflecting surfaces decrease toward the reference point X. Accordingly, radial light reflecting surfaces may be partly thinned out as needed when they are placed.

Figure 2:
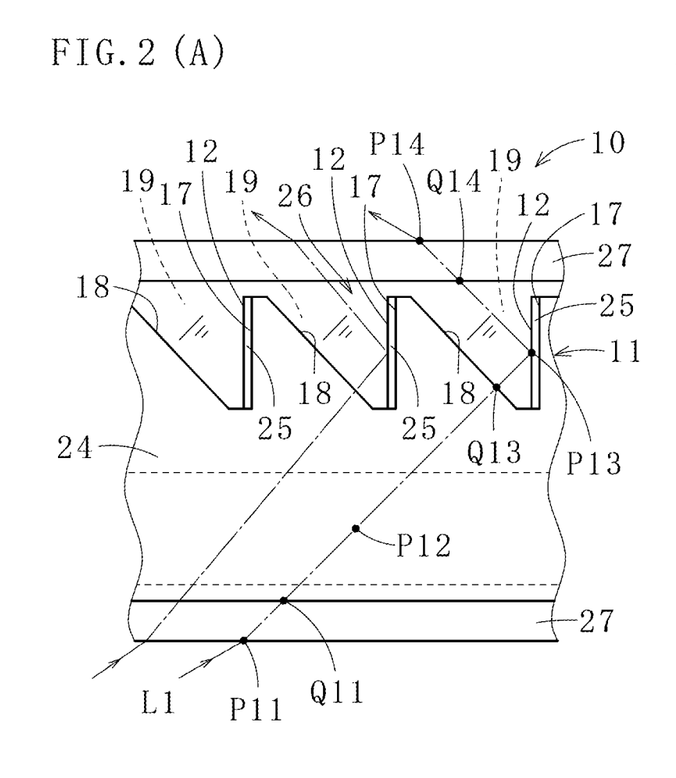
FIG. 2(A) is an enlarged sectional view of a portion A-A taken along B-B in FIG. 1.
FIG. 2(B) is an enlarged sectional view of a portion C-C taken along D-D in FIG. 1.

Referring to FIG. 1, the radial light reflecting surfaces 12 and the concentric light reflecting surfaces 14 are orthogonal to each other at the points of intersection between the respective radial light reflecting surfaces 12 and the concentric light reflecting surfaces 14 in planar view. The radial light reflecting surfaces 12 are placed radially centered on the reference point X, and the concentric light reflecting surfaces 14 are bent along concentric circles centered on the reference point Y, respectively. However, in a minute range, the adjacent radial light reflecting surfaces 12 can be regarded as being placed parallel, and the respective concentric light reflecting surfaces 14 can be regarded as being linear (flat) and placed orthogonal to the respective radial light reflecting surfaces 12. Accordingly, referring to FIG. 2(A) showing an enlarged sectional view of a portion A-A taken along B-B in FIG. 1, the radial light reflecting surfaces 12 are placed at equal intervals. In comparison with FIG. 2(A), FIG. 2(B) shows a 90°-rotated enlarged sectional view of a portion C-C taken along D-D in FIG. 1.

As shown in FIGS. 2(A) and 2(B), the radial light reflecting surface 12 is formed by using a vertical surface 17 of a substantially triangular cross-section groove 19 having the vertical surface 17 and an inclined surface 18, and the concentric light reflecting surface 14 is formed by using a vertical surface 20 of a substantially triangular cross-section groove 22 having the vertical surface 20 and an inclined surface 21. For example, a molded body 24 having the plurality of grooves 19 formed radially on the obverse surface side and the plurality of grooves 22 formed concentrically on the reverse surface side is manufactured by molding (injection molding, press molding, roll molding, etc.) using a transparent resin as a material. The radial light reflecting surfaces 12 and the concentric light reflecting surfaces 14, each being a mirror surface, are formed by selectively covering the vertical surfaces 17 and 20 of the respective grooves 19 and 22 with a reflecting metal material 25. The aerial image forming element 10 having the radial light reflecting surfaces 12 and the concentric light reflecting surfaces 14 respectively formed on the obverse surface side and reverse surface side of the flat plate-like transparent base member 11 is obtained by filling the insides of the grooves 19 and 22 of the molded body 24, in which the radial light reflecting surfaces 12 and the concentric light reflecting surfaces 14 are formed, with a transparent adhesive agent 26 and joining resin or glass transparent plates 27 on the obverse surface and reverse surface of the molded body 24.

In this case, molding for the molded body 24 suitably uses a thermoplastic resin having a relatively high melting point and high transparency. More specifically, for example, ZEONEX (registered trademark) (Cyclo Olefin Polymer having glass transition temperature Tg=100° C. to 160° C. and refractive index η1=1.535) is used. In addition, it is possible to use, for example, thermoplastic resins such as polymethylmethacrylate (acrylic resin), amorphous fluorine resin, PMMA, optical polycarbonate, fluorene-based polyester, and polyether sulfone.

The reflecting metal material 25 regularly (specularly) reflects light and uses a metal such as aluminum as a raw material. This material can cover the vertical surfaces 17 and 20 of the grooves 19 and 22 by sputtering, metal deposition, micro-metal particle spraying, irradiation with ion beams, coating or plating with a metal paste, etc.

The refractive index of the transparent adhesive agent 26 and the transparent plates 27 is preferably equal to the refractive index η1 of the transparent resin used for the molding of the molded body 24 or approximate to the refractive index η1 within the range of ±5%. However, the refractive index is not limited to them. The adhesive used as the transparent adhesive agent 26 is, for example, a photo-curable resin which cures by irradiation with ultraviolet rays, etc., a thermosetting resin, a room-temperature curable resin, or an adhesive agent such as a two-part adhesive or an optical adhesive agent formed from a refractive index-controlled resin whose refractive index is adjusted. Note that the molded body 24 may be filled with a semi-molten transparent resin having a refractive index equal or approximate to the refractive index of the transparent adhesive agent 26 instead of the transparent adhesive agent 26 and may be joined (integrated) to transparent plates. In addition, the transparent plates may be omitted, and the surface of the transparent resin filling and cured in the grooves may be, for example, cut or polished into a flat surface (planarized surface).

The operation of the aerial image forming element 10 having the above arrangement will be described with reference to FIGS. 2(A) and 2(B). Of the light emitted from a target object (not shown), light L1 enters from P11 on the surface of the reverse surface side (the lower surface side in this case) of the transparent base member 11 into the aerial image forming element 10 and is reflected at P12 on the second light reflecting surface 14. The light L1 then propagates through the transparent base member 11 (molded body 24) and is reflected at P13 on the first light reflecting surface 12 to emerge from P14 on the surface of the obverse surface side (the upper surface side in this case) of the transparent base member 11 into the air.

In this case, the light L1 enters from the transparent plate 27 at Q11 in FIG. 2(B) into the transparent adhesive agent 26, enters from the transparent adhesive agent 26 at Q12 into the molded body 24, enters from the molded body 24 at Q13 in FIG. 2(A) into the transparent adhesive agent 26, and enters from the transparent adhesive agent 26 at Q14 into the transparent plate 27. However, since the molded body 24, the transparent adhesive agent 26, and the obverse and reverse transparent plates 27 constituting the transparent base member 11 of the aerial image forming element 10 all have similar refractive indices (equal or approximate), the influences of refraction at the respective interfaces are significantly small. Accordingly, the light is free from phenomenon such as total reflection and spectroscopic dispersion.

As described above, innumerable light beams emitted from a target object and reflected once by each of the second light reflecting surface 14 and the first light reflecting surface 12 of the aerial image forming element 10 are formed into images in the air, thereby obtaining an aerial image (not shown) as a real image of the target object at a position symmetric to the target object through the aerial image forming element 10. The light L1 is refracted at P11 on the transparent plate 27 on the reverse surface side of the transparent base member 11 and P14 on the transparent plate 27 on the obverse surface side. However, since the two transparent plates 27 are homogeneous and have similar refractive indices, all the light beams, like the first light L1, associated with the formation of an aerial image are refracted at a predetermined (equal) angle at the obverse and reverse sides of the transparent base member 11 regardless of the incident position and exit position. Accordingly, these refractions have no influence on image forming.

This embodiment has exemplified the case in which light enters from the reverse surface side (concentric light reflecting surface 14 side) of the transparent base member 11. However, even if light enters from the obverse surface side (radial light reflecting surface 12 side) of the transparent base member 11 upon interchanging of the obverse and reverse sides (the upper and lower sides in FIGS. 2(A) and 2(B)) of the aerial image forming element 10, an aerial image is formed. Note that the obverse and reverse sides (the left and right sides in FIGS. 2(A) and 2(B)) of the radial light reflecting surface 12 and the concentric light reflecting surface 14 each functions as a light reflecting surface.

As shown in FIG. 1, in this embodiment, the reference point X and the reference point Y are located on an extension of one of the diagonal lines of the transparent base member 11 in planar view. Accordingly, in using the aerial image forming element 10, the occurrence of ghost images can be prevented in the following way. The observer observes from a position facing one of the sides a1 to a4 of the outer circumference of the transparent base member 11 in planar view (in attaching the aerial image forming element 10 to the aerial image forming device, one of the sides a1 to a4 of the outer circumference of the transparent base member 11 becomes parallel to the front surface of the aerial image forming device), thereby preventing the direction of the gaze of the observer from becoming parallel to the radial light reflecting surface 12.

In manufacturing the aerial image forming element 10, first, a mold may be prepared in accordance with the shape of the transparent base member 11 and the placement of the radial light reflecting surface 12 and the concentric light reflecting surface 14 to mold the molded body 24 corresponding to the transparent base member 11 one by one. If, for example, a mold is prepared in accordance with a large molded body 28 with a doughnut-like outer shape (the virtual lines in FIG. 1 show part of the large molded body 28 with a doughnut-like outer shape) having the radial light reflecting surface 12 and the concentric light reflecting surface 14 formed on the entire obverse and reverse surfaces (whole circumference) centered on the reference points X and Y shown in FIG. 1, a plurality of transparent base members 11 can be obtained by cutting out a plurality of molded bodies 24 each having a square outer shape from the single molded doughnut-like large molded body 28.

An aerial image forming element 10a and an aerial image forming device 30 using the same according to the second embodiment of the present invention shown in FIG. 3 will be described next. Note that the same reference numerals denote the same constituent elements as those of the first embodiment, and description thereof will be omitted.

The aerial image forming element 10a differs from the aerial image forming element 10 in that a reference point X of a plurality of radial light reflecting surfaces 12 and a reference point Y of a plurality of concentric light reflecting surfaces 14 are located on an extension of one of two diagonal lines of a transparent base member 11a in planar view which is rotated clockwise by a predetermined angle α within a horizontal plane centered on an intersection Z between the two diagonal lines (specifically, a reference line S obtained by rotating one of the diagonal lines; the same applies hereinafter). The placement of the respective radial light reflecting surfaces 12 and the respective concentric light reflecting surfaces 14 on the transparent base member 11a of the aerial image forming element 10 is equivalent to the placement obtained by rotating the respective radial light reflecting surfaces 12 and the respective concentric light reflecting surfaces 14 on the transparent base member 11 of the aerial image forming element 10 clockwise by the predetermined angle α within a horizontal plane centered on the intersection Z of the two diagonal lines. However, the positional relationship between the respective radial light reflecting surfaces 12 and the respective concentric light reflecting surfaces 14 does not differ between the aerial image forming element 10a and the aerial image forming element 10. Accordingly, the enlarged sectional view of a portion E-E taken along F-F in FIG. 3 and the enlarged sectional view of a portion G-G taken along H-H in FIG. 3 become those shown in FIGS. 4(A) and 4(B).

Figure 4:
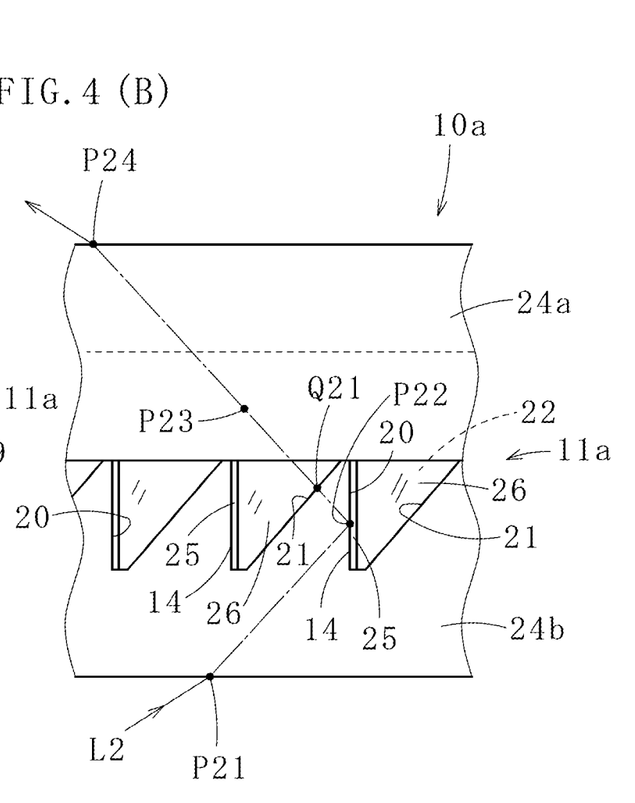
FIG. 4(A) is an enlarged sectional view of a portion E-E taken along F-F in FIG. 3.
FIG. 4(B) is an enlarged sectional view of a portion G-G taken along H-H in FIG. 3.

In this case, by comparing FIGS. 2(A) and 2(B) with FIGS. 4(A) and 4(B), it is found that the aerial image forming element 10 has the plurality of radial light reflecting surfaces 12 formed on the obverse surface side of the single molded body 24 constituting the transparent base member 11 and the plurality of concentric light reflecting surfaces 14 formed on the reverse surface side. On the other hand, the aerial image forming element 10a has the plurality of radial light reflecting surfaces 12 and the plurality of concentric light reflecting surfaces 14 respectively formed on first and second molded bodies 24A and 24B constituting the transparent base member 11a.

That is, in the case of the aerial image forming element 10a, the first molded body 24a having a plurality of grooves 19 formed radially on the obverse surface (one-surface) side and the second molded body 24b having a plurality of grooves 22 formed concentrically on the obverse surface (one-surface) side are separately manufactured. Vertical surfaces 17 and 20 of the grooves 19 and 22 are selectively covered with the reflecting metal material 25 to form the radial light reflecting surfaces 12 and the concentric light reflecting surfaces 14 respectively on the first and second molded bodies 24a and 24b. The first and second molded bodies 24a and 24b, on which the radial light reflecting surfaces 12 and the concentric light reflecting surfaces 14 are respectively formed, are stacked and joined to each other so as to be integrated with the transparent adhesive agent 26 filling the grooves 19 and 22, thereby obtaining the aerial image forming element 10a having the radial light reflecting surfaces 12 placed on the obverse surface side of the transparent base member 11a and the concentric light reflecting surfaces 14 placed on the reverse surface side.

The operation of the aerial image forming element having the above arrangement will be described with reference to FIGS. 4(A) and 4(B). Of the light emitted from a target object (not shown), light L2 enters from P21 on the surface of the reverse surface side (the lower surface side of the second molded body 24b in this case) of the transparent base member 11a into the aerial image forming element 10a and is reflected at P22 on the second light reflecting surface 14. The light L2 then propagates through the transparent base member 11a and is reflected at P23 on the first light reflecting surface 12 to emerge from P24 on the surface of the obverse surface side (the upper surface side of the first molded body 24a in this case) of the transparent base member 11a into the air.

In this case, although the light L2 enters from the second molded body 24b at Q21 in FIG. 4(B) into the transparent adhesive agent 26 and enters from the transparent adhesive agent 26 at Q22 in FIG. 4(A) into the first molded body 24a, since the first and second molded bodies 24a and 24b constituting the transparent base member 11a of the aerial image forming element 10a and the transparent adhesive agent 26 all have similar refractive indices (equal or approximate), the influences of refraction at the respective interfaces are significantly small. Accordingly, the light is free from phenomenon such as total reflection and spectroscopic dispersion.

In the above manner, innumerable light beams emitted from a target object and reflected once by each of the second light reflecting surface 14 and the first light reflecting surface 12 of the aerial image forming element 10a are formed into images in the air, thereby obtaining an aerial image (not shown) as a real image of the target object at a position symmetric to the target object through the aerial image forming element 10a. The light L2 is refracted at P21 on the surface of the reverse surface side of the transparent base member 11a and refracted at P24 on the surface of the obverse surface side. However, since the first and second molded bodies 24a and 24b are homogeneous and have similar refractive indices, like the light L2, all the light beams associated with the formation of an aerial image are refracted at a predetermined (equal) angle at the obverse and reverse sides of the transparent base member 11a regardless of the incident position and the exit position. Accordingly, these refractions have no influence on image forming.

In addition, in the case of the aerial image forming element 10a, as described above, the reference point X of each radial light reflecting surface 12 and the reference point Y of each concentric light reflecting surface 14 are located on an extension of a diagonal line rotated clockwise by an angle α within a horizontal plane centered on the intersection Z. This can minimize the region where the direction of the gaze of an observer M in planar view coincides with the direction of the radial light reflecting surface 12 and the concentric light reflecting surface 14 as in the case of the aerial image forming device 30 shown in FIG. 3. Accordingly, this prevents the occurrence of ghost images and can improve the visibility as compared with the aerial image forming element 10 and the aerial image forming device using the same.

In this case, the predetermined angle α is preferably 5° to 15° (more preferably 10°). However, this is not limited, and an appropriate value can be selected.

This embodiment has exemplified the case in which light enters from the reverse surface side (second molded body 24b side) of the transparent base member 11a. However, even if light enters from the obverse surface side (first molded body 24a side) of the transparent base member 11a upon interchanging of the obverse and reverse sides (the upper and lower sides in FIGS. 4(A) and 4(B)) of the aerial image forming element 10a, an aerial image can be formed.

In addition, as in this embodiment, the aerial image forming element 10a is placed in the housing of the aerial image forming device 30 indicated by the virtual lines such that a side a1 of sides a1 to a4 of the transparent base member 11a in planar view which overlaps a start position when each of the concentric light reflecting surface 14 is traced clockwise faces the observer M. This placement obtains the highest ghost image reduction effect. However, the placement of the aerial image forming element 10a is not limited to this. The aerial image forming element 10a may be placed such that any one of the sides a1 to a4 faces the observer M, and the optimal placement also differs depending on the magnitude of the predetermined angle α. Although the aerial image forming element 10a is preferably installed in the housing of the aerial image forming device 30 so as to be inclined by a predetermined angle with respect to a horizontal plane, the aerial image forming device 30 may be inclined instead of the aerial image forming element 10a.

Figure 3:
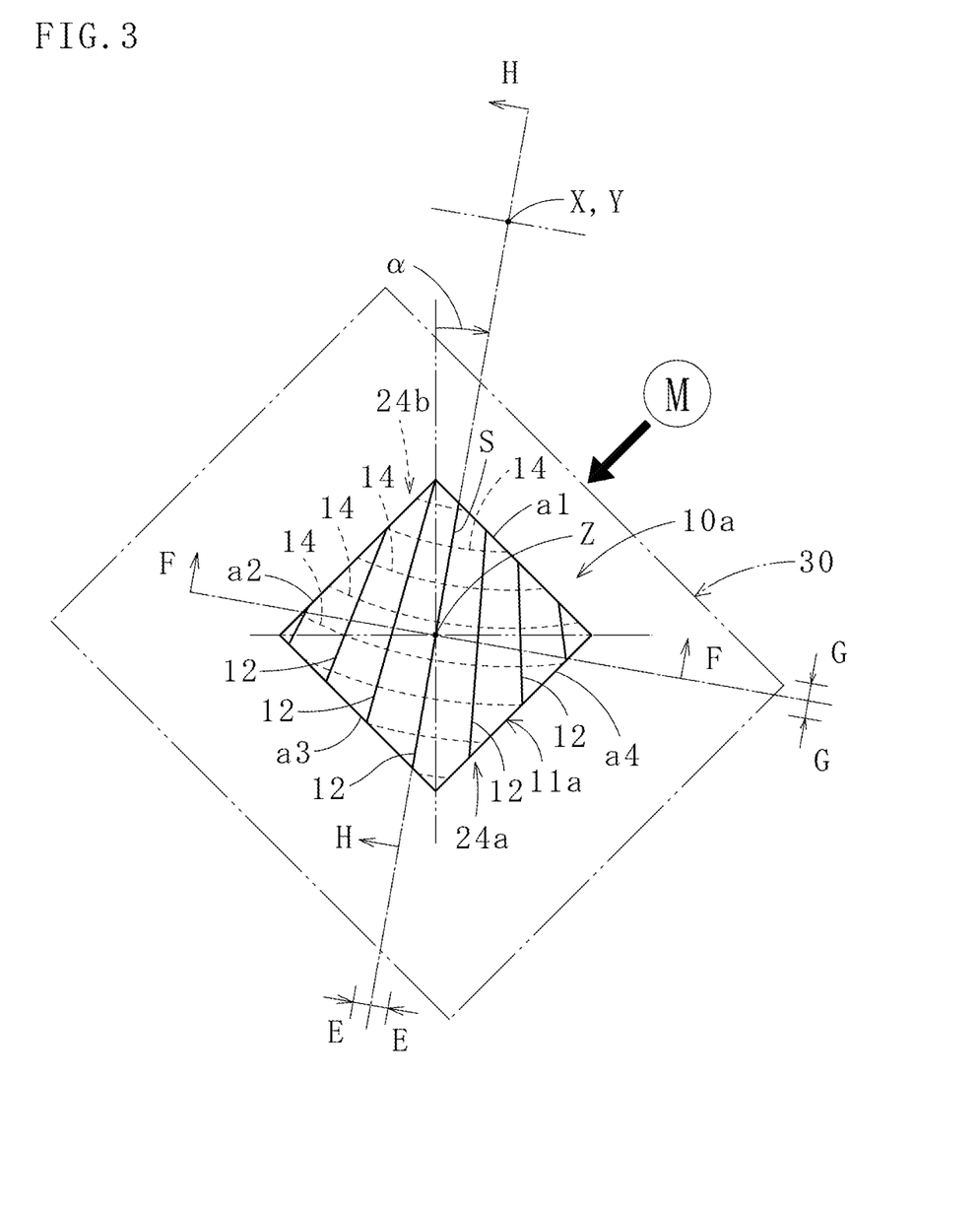
FIG. 3 is a plan view showing an aerial image forming element according to the second embodiment of the present invention.

In manufacturing the aerial image forming element 10a, first, a mold corresponding to the first and second molded bodies 24a and 24b may be prepared in accordance with the shape of the transparent base member 11a shown in FIG. 3 and the placement of each of the radial light reflecting surfaces 12 and the concentric light reflecting surfaces 14. If, for example, a mold is prepared in accordance with the first and second large molded bodies each having a doughnut-like outer shape and the radial light reflecting surfaces 12 and the concentric light reflecting surfaces 14 formed on the entire surface (whole circumference) centered on the reference points X and Y, the first and second molded bodies 24a and 24b each having a square outer shape can be respectively cut out from the doughnut-like molded first and second large molded bodies. That is, in cutting out the first and second molded bodies 24a and 24b corresponding to the square transparent base member 11a from the first and second doughnut-like large molded bodies, cutting positions and angles (ranges) may be selected such that the radial light reflecting surfaces 12 and the concentric light reflecting surfaces 14 each is rotated by the angle α with respect to the square transparent base member 11a within a horizontal plane centered on the intersection Z, as shown in FIG. 3. This makes it easy to prepare a mold and improves the productivity.

Note that in this embodiment, the aerial image forming element 10a is manufactured by filling the grooves 19 and 22 with the transparent adhesive agent 26, while the grooves 19 of the first molded body 24a in which the radial light reflecting surfaces 12 are formed face the grooves 22 of the second molded body 24b in which the concentric light reflecting surfaces 14 are formed, and joining the first and second molded bodies 24a and 24b. However, an aerial image forming element can also be manufactured by respectively filling the grooves 19 of the first molded body 24a, in which the radial light reflecting surfaces 12 are formed, and the grooves 22 of the second molded body 24b, in which the concentric light reflecting surfaces 14 are formed, with a semi-molten transparent resin having a refractive index similar to that of the first and second molded bodies 24a and 24b, separately curing the resin in the grooves so as to flatten the resultant surfaces, stacking the surfaces, and joining (integrating) the surfaces with a transparent adhesive agent. In this case, the obverse surfaces (the surfaces of the transparent resin filling the grooves) or the reverse surfaces may be joined to each other so as to make them face each other, or one obverse surface and the other reverse surface may be joined to each other so as to make them face each other. In either case, since each radial light reflecting surface and each concentric light reflecting surface can be respectively placed on the obverse surface side and the reverse surface side of the completed aerial image forming element (transparent base member), there is no difference in operation, and an aerial image can be formed. Although the surfaces of the transparent resin filling the grooves are preferably flattened (planarized) by cutting, polishing, etc., the grooves may be filled with a transparent adhesive agent instead of the transparent resin, and a transparent plate may be joined to each surface.

In manufacturing the aerial image forming element 10a from the first and second large molded bodies, a plurality of aerial image forming elements can also be cut out from the structure formed by, at first, covering the vertical surfaces of the grooves of the first and second large molded bodies with a reflecting metal material, forming radial light reflecting surfaces and concentric light reflecting surfaces on the entire first and second large molded bodies, and stacking and joining the surfaces to each other instead of, cutting out the first and second molded bodies 24a and 24b from the first and second large molded bodies, stacking and joining the radial light reflecting surfaces 12 and the concentric light reflecting surfaces 14 formed by selectively covering the vertical surfaces 17 and 20 of the grooves 19 and 22 with the reflecting metal material 25.

Note that molding for the first and second molded bodies 24a and 24b uses a transparent resin similar to that used for molding for the molded body 24. At this time, the first and second molded bodies 24a and 24b are preferably molded with the same transparent resin. However, different transparent resins may be used as long as the refractive indices of the resins are the same or approximate to each other within ±5%. In addition, as in the first embodiment, a semi-molten transparent resin may be used instead of the transparent adhesive agent 26.

Figure 5:
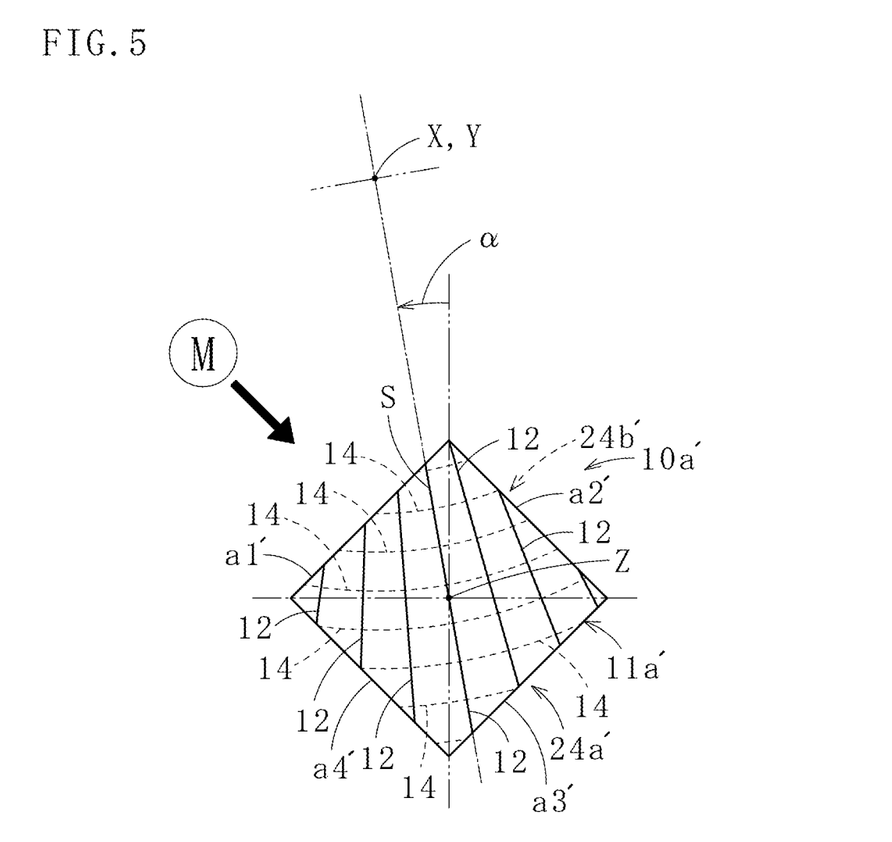
FIG. 5 is a plan view showing a modification of the same aerial image forming element.

An aerial image forming element 10a' according to a modification shown in FIG. 5 will be described next. Note that the same reference numerals denote the same constituent elements as those of the first and second embodiments, and description thereof will be omitted.

The aerial image forming element 10a' differs from the aerial image forming element 10a in that the rotating direction (moving direction) of the reference point X and the reference point Y is counterclockwise, and a side a1', of sides a1' to a4' of a transparent base member 11a' in planar view, which overlaps an end position when each concentric light reflecting surface 14 is traced clockwise is placed to face the observer M. Accordingly, the structure of the aerial image forming element 10a' is bilaterally symmetric to that of the aerial image forming element 10a in planar view, the material of first and second molded bodies 24a' and 24b' constituting the transparent base member 11a' is the same as that of the first and second molded bodies 24a and 24b constituting the transparent base member 11a, and the operation, function, and effect of the aerial image forming element 10a' are similar to those of the aerial image forming element 10a. Accordingly, description of them will be omitted. Note that the shapes of the first and second molded bodies 24a and 24b constituting the transparent base member 11a of the aerial image forming element 10a in planar view are only bilaterally symmetric (the rotating direction of the predetermined angle α is opposite) to that of the first and second molded bodies 24a' and 24b' constituting the transparent base member 11a' of the aerial image forming element 10a'. Therefore, the aerial image forming element can be manufactured by using either the first and second molded bodies 24a and 24b or the first and second molded bodies 24a' and 24b' by only selecting cutting positions and angles with respect to the first and second large molded bodies each having a doughnut-like shape, as described above. Accordingly, it is possible to make a mold that can be commonly used in required manufacturing processes of the aerial image forming element 10a and the aerial image forming element 10a'.

Figure 6:
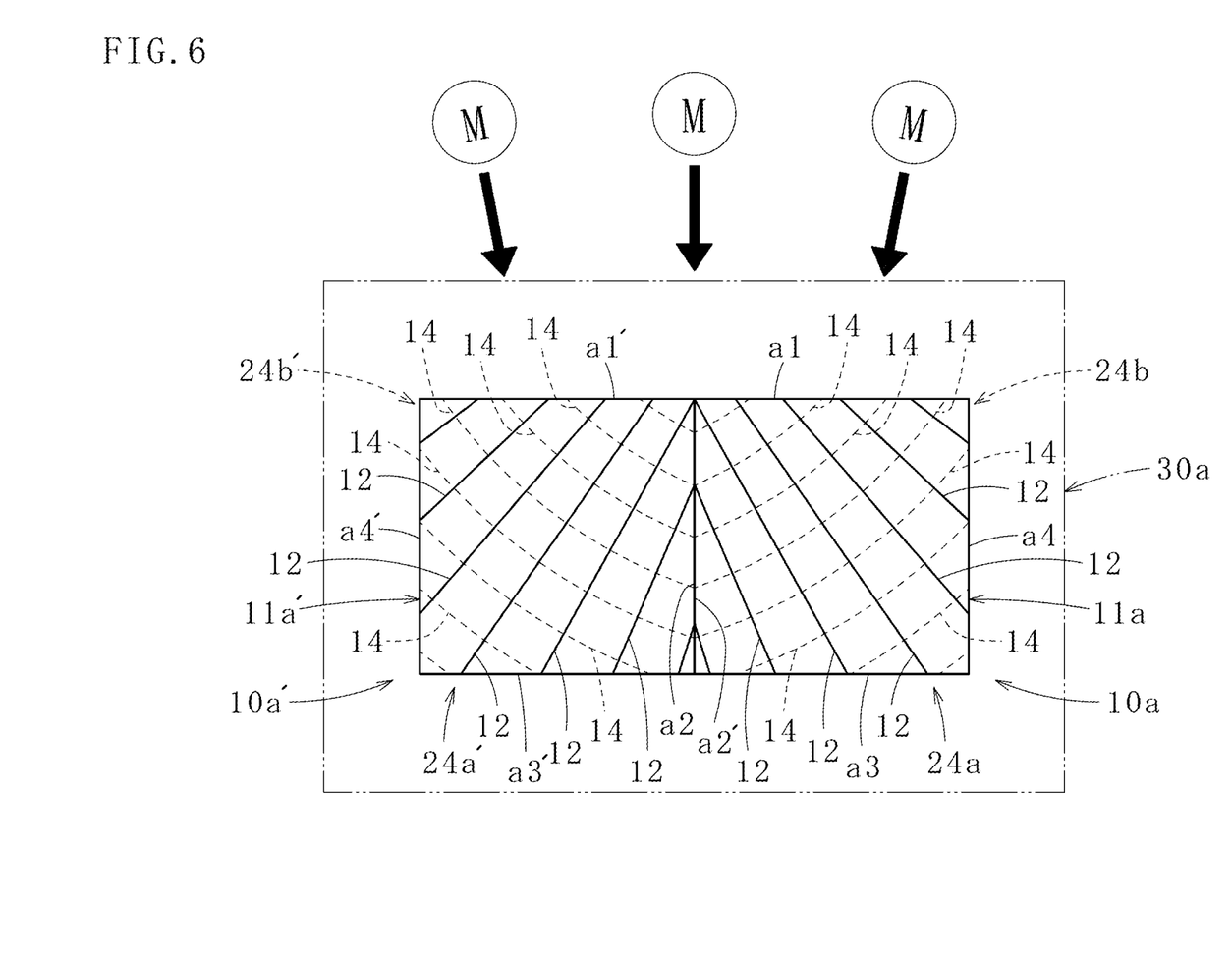
FIG. 6 is a plan view showing an aerial image forming device according to the third embodiment of the present invention.

An aerial image forming device 30a according to the third embodiment of the present invention shown in FIG. 6 will be described next. The same reference numerals denote the same constituent elements as those in the first and second embodiments, and description thereof will be omitted.

The aerial image forming device 30a differs from the aerial image forming device 30 in that the aerial image forming element 10a and the aerial image forming element 10a' described above are placed on the right and left sides in planar view in the housing indicated by the virtual line. In this case, the structures of the aerial image forming element 10a' and the aerial image forming element 10a are bilaterally symmetric in planar view, and a side a2, of sides a1 to a4 of the aerial image forming element 10a (transparent base member 11a) in planar view, which overlaps an end position when each concentric light reflecting surface 14 of the aerial image forming element 10a is traced clockwise is joined to a side a2', of sides a1' to a4' of the aerial image forming element 10a' (transparent base member 11a') in planar view, which overlaps a start position when each concentric light reflecting surface 14 of the aerial image forming element 10a' is traced clockwise to integrate the aerial image forming element 10a and the aerial image forming element 10a'. This makes the end position of each concentric light reflecting surface 14 of the aerial image forming element 10a coincide with the start position of each concentric light reflecting surface 14 of the aerial image forming element 10a', so that each concentric light reflecting surface 14 of the aerial image forming element 10a and each concentric light reflecting surface 14 of the aerial image forming element 10a' are continuously formed.

Accordingly, the aerial image forming device 30a can form an aerial image by the same operation as that of the aerial image forming device 30 and has a viewing angle almost twice that of the aerial image forming device 30. Note that in this embodiment, the side a1 of the aerial image forming element 10a and the side a1' of the aerial image forming element 10a' are placed in the housing so as to face the observer M. However, the side a3 of the aerial image forming element 10a and the side a3' of the aerial image forming element 10a' may be placed in the housing so as to face the observer M. In addition, in this embodiment, the side a2 of the aerial image forming element 10a and the side a2' of the aerial image forming element 10a' are placed so as to overlap each other. However, when the two aerial image forming elements are to be placed on the right and left sides in planar view, the two aerial image forming elements may be placed so as to be bilaterally symmetric in planar view, and one of the four sides of the outer circumference of one of the two aerial image forming elements and one of the four sides of the outer circumference of the other aerial image forming element may also be placed so as to be overlap each other.

Note that instead of separately manufacturing two aerial image forming elements and combining them (placing them bilaterally symmetrically), it is possible to eliminate the need for positioning work and joining work by manufacturing an aerial image forming element structured such that, at first, two aerial image forming elements are placed bilaterally symmetrically and integrated with each other, thereby simplifying the manufacturing process.

Figure 7:
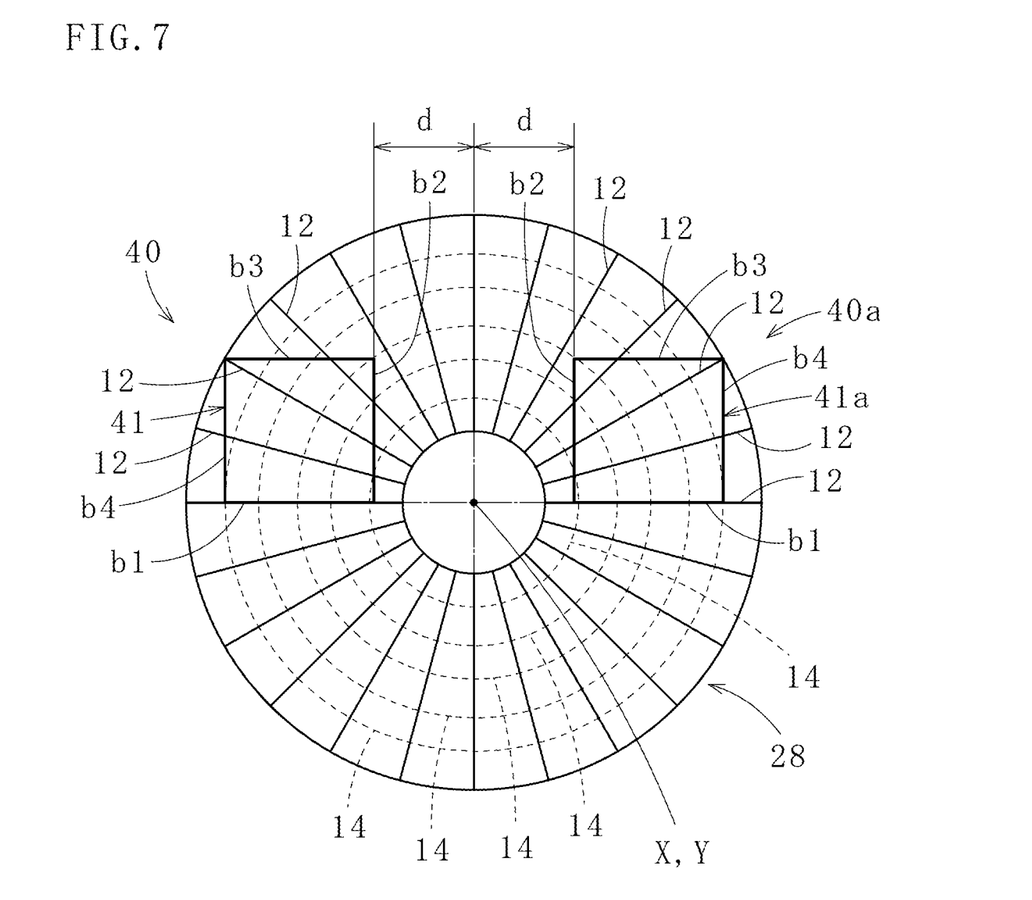
FIG. 7 is a plan view showing an aerial image forming element according to the fourth embodiment of the present invention.

An aerial image forming element 40 according to the fourth embodiment of the present invention shown in FIG. 7 will be described next. The same reference numerals denote the same constituent elements as those in the first to third embodiments, and description thereof will be omitted.

The aerial image forming element 40 differs from the aerial image forming element 10 in the following point. In the aerial image forming element 10, the reference point X and the reference point Y are located on an extension of one of the diagonal lines of the transparent base member 11 in planar view (see FIG. 1). On the other hand, in the aerial image forming element 40, a reference point X and a reference point Y are located on an extension of a side b1 (the right-side extension in this case), of sides b1 to b4 of the outer circumference of a transparent base member 41 in planar view. As described above, since the aerial image forming element 40 and the aerial image forming element 10 differ in the positions of the reference point X and the reference point Y, the positions and ranges of the formation of radial light reflecting surfaces 12 and concentric light reflecting surfaces 14 differ between the transparent base member 41 of the aerial image forming element 40 and the transparent base member 11 of the aerial image forming element 10. However, the positional relationships and imaging operations of the respective radial light reflecting surfaces 12 and the respective concentric light reflecting surfaces 14 do not differ between the aerial image forming element 40 and the aerial image forming element 10.

In the aerial image forming element 40, by locating the reference points X and Y on an extension of the side b1, the placement of the radial light reflecting surfaces 12 and the concentric light reflecting surfaces 14 inside the transparent base member 41 in planar view becomes ununiform (asymmetric). This can reduce the region where the direction of the gaze of the observer approaches parallelism with the radial light reflecting surfaces 12 or the concentric light reflecting surfaces 14 regardless of any side of the respective sides b1 to b4 to which the observation position of an observer faces (regardless of any side of the respective sides b1 to b4 of the outer circumference of the transparent base member 41 which becomes parallel to the front surface of the aerial image forming device when the aerial image forming element 40 is attached to the aerial image forming device) and suppress the occurrence of ghost images.

In addition, in the aerial image forming element 40, the reference points X and Y are located on the right-side extension of the side b1 of the transparent base member 41 in planar view. In contrast to this, in another aerial image forming element 40a shown in FIG. 7, the reference points X and Y are located on the left-side extension of the side b1 of a transparent base member 41a in planar view. The structure of aerial image forming element 40a is bilaterally symmetric to that of the aerial image forming element 40 in planar view, and the operation, function, and effect of the aerial image forming element 40a are similar to those of the aerial image forming element 40.

When a transparent base member is formed in a square shape in planar view like the aerial image forming elements 40 and 40a, even if the radial light reflecting surfaces 12 and the concentric light reflecting surfaces 14 are formed such that the reference points X and Y are located on an extension of any side of the four sides b1 to b4 of the outer circumference, the placement of the radial light reflecting surfaces 12 and the concentric light reflecting surfaces 14 inside the transparent base member becomes the same as in either of the aerial image forming elements 40 and 40a as long as the dimensions at the transparent base member and a distance d from the reference points X and Y to the transparent substrate remain the same. In addition, assume that the aerial image forming elements 40 and 40a (transparent base members 41 and 41a) are to be cut out from the large molded body 28 having the doughnut-like outer shape having the radial light reflecting surfaces 12 and the concentric light reflecting surfaces 14 formed on the obverse and reverse surfaces. In this case, even if the cutting positions (angles) are rotated in the circumferential direction centered on the reference points X and Y, the placement of the radial light reflecting surfaces 12 and the concentric light reflecting surfaces 14 inside the base member becomes the same as that in either of the aerial image forming elements 40 and 40a by only rotating the whole aerial image forming element (transparent base member). This makes it possible to manufacture the plurality of aerial image forming elements 40 and 40a from the single large molded body 28.

Note that a transparent base member may be formed in a rectangular shape in planar view, and an aspect ratio is appropriately selected. However, since the vertical and horizontal sides differ in length, the placement of the radial light reflecting surfaces 12 and the concentric light reflecting surfaces 14 inside the transparent base member in planar view changes depending on an extension of one of the four sides of the outer circumference on which the reference points X and Y are located when the radial light reflecting surfaces 12 and the concentric light reflecting surfaces 14 are formed. In addition, the inside of the transparent base member may partly include a region where neither radial light reflecting surface 12 nor concentric light reflecting surface 14 is formed.

Figure 8:
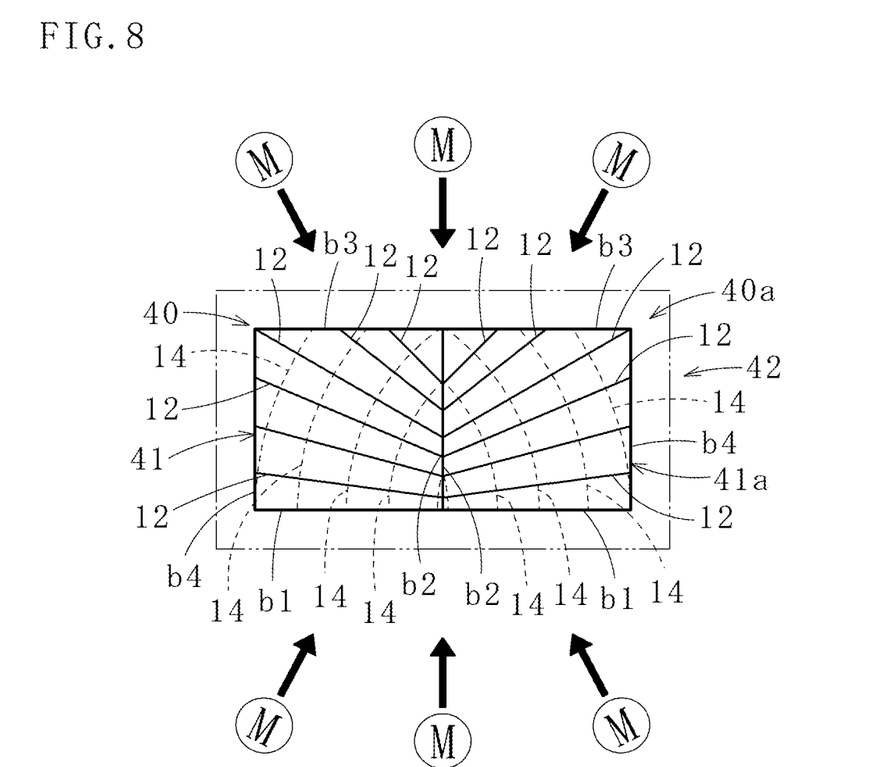
FIG. 8 is a plan view showing an aerial image forming device including the same aerial image forming element.

An aerial image forming device 42 using the aerial image forming elements 40 and 40a shown in FIG. 8 will be described next.

In the aerial image forming device 42, the two aerial image forming elements 40 and 40a are placed bilaterally symmetrically in planar view. As described above, the structure of the aerial image forming element 40 is bilaterally symmetric to that of the aerial image forming element 40a in planar view, and the aerial image forming element 40 and the aerial image forming element 40a are integrated by joining the side b2 of the aerial image forming element 40 (transparent base member 41) in planar view to the side b2 of the aerial image forming element 40a (transparent base member 41a) in planar view.

Accordingly, the aerial image forming device 42 can form an aerial image by the same operation as that of the aerial image forming device 30a and has a viewing angle almost twice that of the aerial image forming device 30 like the aerial image forming device 30a. This allows the observer M to observe a sharp aerial image with few ghost images from a position facing the side b1 of the aerial image forming element 40 and the side b1 of the aerial image forming element 40a or a position facing the side b3 of the aerial image forming element 40 and the side b3 of the aerial image forming element 40a.

Figure 9:
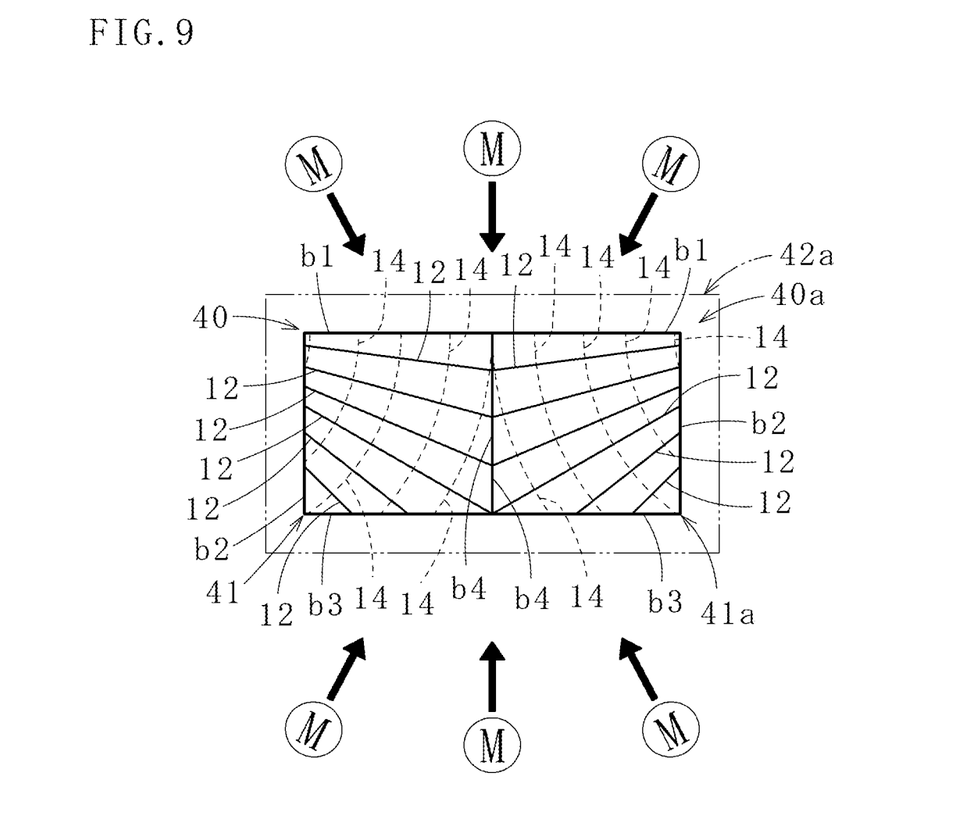
FIG. 9 is a plan view showing a modification of the same aerial image forming device.

An aerial image forming device 42a according to a modification shown in FIG. 9 will be described next.

The aerial image forming device 42a differs from the aerial image forming device 42 in that the two aerial image forming elements 40 and 40a are rotated by 180°. In addition, the aerial image forming elements 40 and 40a are integrated with each other by joining the side b4 of the aerial image forming element 40 (transparent base member 41) in planar view to the side b4 of the aerial image forming element 40a (transparent base member 41a) in planar view. The aerial image forming device 42a can implement the same operation, function, and effect as those of the aerial image forming device 42.

Although the present invention has been described above with reference to the embodiments, the present invention is not limited to the configurations of the above embodiments at all and includes other embodiments and modifications within the scope of the claims.

The first and fourth embodiments have exemplified the integrated type aerial image forming element obtained by forming the radial light reflecting surfaces and the concentric light reflecting surfaces respectively formed on the obverse and reverse surfaces of the single molded body. The second and third embodiments have exemplified the laminated type aerial image forming element obtained by stacking the first molded body having the radial light reflecting surfaces formed on the obverse surface (one surface) on the second molded body having the concentric light reflecting surfaces formed on the obverse surface (one surface) and joining the molded bodies to each other. However, the aerial image forming element according to the first and fourth embodiments may be manufactured by using the laminated type, and the aerial image forming element according to the second and third embodiments may be manufactured by using the integrated type.

In the above embodiments, the vertical surfaces of the substantially triangular cross-section grooves are covered with the reflecting metal material, and the resultant structures function as the radial light reflecting surfaces and the concentric light reflecting surfaces. However, polishing the surface of a mold used for molding to the degree that light is not irregularly reflected will make the surface (the inner surfaces of the grooves) of the molded body obtained by molding become a mirror surface similar to that of the mold, thereby allowing the vertical surfaces of the grooves to directly function as radial light reflecting surfaces and concentric light reflecting surfaces by using the total reflection of light. This eliminates the need to cover the vertical surfaces of the grooves with a reflecting metal material. In addition, since the total reflection of light uses the air in the grooves, an aerial image forming element (transparent base member) can be manufactured without filling the insides of the grooves of the molded body with a transparent resin or transparent adhesive agent. Note that when a plurality of grooves are formed radially in the obverse surface of one molded body and a plurality of grooves are formed concentrically in the reverse surface, since foreign substances such as dust tend to stay in the grooves if each groove is kept open to the atmospheric pressure, air layers are preferably formed inside the respective grooves by covering the grooves by, for example, joining transparent plates having a refractive index similar to that of the molded body to the both surfaces (obverse and reverse surfaces) of the molded body. In addition, instead of the formation of air layers inside the respective grooves, a gas such as nitrogen may be sealed inside the respective grooves so as to form air layers or the inside of respective grooves may be vacuumed.

In the above embodiments, the aerial image forming element is manufactured by using the grooved molded body obtained by molding the transparent resin. However, an aerial image forming element can also be manufactured by using a grooved transparent plate obtained by processing the surface of a transparent flat plate by laser, etching, or the like.

INDUSTRIAL APPLICABILITY

Aerial image forming elements that can be easily manufactured and have excellent visibility are used to enlarge the viewing angles of aerial image forming devices, prevent the occurrence of ghost images, and realize sharp aerial images, thereby promoting the upsizing and mass production of aerial image forming devices and expanding the use applications.

REFERENCE SIGNS LIST 10, 10a, 10a', 40, 40a: aerial image forming element, 11, 11a, 11a', 41, 41a: transparent base member, 12: first light reflecting surface (radial light reflecting surface), 14: second light reflecting surface (concentric light reflecting surface), vertical surface, 18: inclined surface, 19: groove, 20: vertical surface, 21: inclined surface, 22: groove, 24: molded body, 24a, 24a': first molded body, 24b, 24b': second molded body, 25: reflecting metal material, 26: transparent adhesive agent, 27: transparent plate, 28: large molded body, 30, 30a, 42, 42a: aerial image forming device

The invention claimed is:

1. An aerial image forming element that includes a plurality of first light reflecting surfaces and a plurality of second light reflecting surfaces respectively formed vertically on an obverse surface and a reverse surface of a flat plate-like transparent base member and forms light externally entering and reflected once by each of the first and second light reflecting surfaces into an image in air, characterized in that the plurality of first light reflecting surfaces are placed radially on an obverse surface side of the transparent base member centered on a reference point X existing outside the transparent base member in planar view, and the plurality of second light reflecting surfaces are placed concentrically on a reverse surface side of the transparent base member centered on a reference point Y overlapping the reference point X in planar view, the transparent base member is formed in a square shape in planar view, and the reference point X and the reference point Y are located on an extension of a reference line obtained by rotating one of two diagonal lines of the transparent base member in planar view by a predetermined angle α within a horizontal plane centered on an intersection Z of the two diagonal lines, and a rotating direction of the predetermined angle α is clockwise, and a side, of sides of an outer circumference of the transparent base member in planar view, which overlaps a start position when each of the second light reflecting surfaces is traced clockwise is placed to face an observer.

2. An aerial image forming element that includes a plurality of first light reflecting surfaces and a plurality of second light reflecting surfaces respectively formed vertically on an obverse surface and a reverse surface of a flat plate-like transparent base member and forms light externally entering and reflected once by each of the first and second light reflecting surfaces into an image in air, characterized in that the plurality of first light reflecting surfaces are placed radially on an obverse surface side of the transparent base member centered on a reference point X existing outside the transparent base member in planar view, and the plurality of second light reflecting surfaces are placed concentrically on a reverse surface side of the transparent base member centered on a reference point Y overlapping the reference point X in planar view, the transparent base member is formed in a square shape in planar view, and the reference point X and the reference point Y are located on an extension of a reference line obtained by rotating one of two diagonal lines of the transparent base member in planar view by a predetermined angle $\alpha$ within a horizontal plane centered on an intersection Z of the two diagonal lines, and a rotating direction of the predetermined angle $\alpha$ is counterclockwise, and a side, of sides of an outer circumference of the transparent base member in planar view, which overlaps an end position when each of the second light reflecting surfaces is traced clockwise is placed to face an observer.

3. An aerial image forming device characterized by comprising the aerial image forming element according to claim 1.

4. An aerial image forming device characterized by comprising the aerial image forming element according to claim 2.

\* \* \* \* \*